G. S. YINGLING.
FISHING REEL.
APPLICATION FILED MAR. 3, 1915.

1,188,230.

Patented June 20, 1916.

Witnesses
Fenton S. Belt
J. W. Sherwood

Inventor
George S. Yingling
By Franklin H. Hough
Attorney

UNITED STATES PATENT OFFICE.

GEORGE S. YINGLING, OF ST. AUGUSTINE, FLORIDA.

FISHING-REEL.

1,188,230.   Specification of Letters Patent.   Patented June 20, 1916.

Application filed March 3, 1915. Serial No. 11,735.

*To all whom it may concern:*

Be it known that I, GEORGE S. YINGLING, a citizen of the United States, residing at St. Augustine, in the county of St. John and State of Florida, have invented certain new and useful Improvements in Fishing-Reels; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in fishing reels and the object in view is to produce a simple and efficient device of this nature adapted to prevent the back lash of the line. Heretofore in reels, it has been customary to thumb the same in order to prevent back lash or to provide other means whereby the checking of the line to prevent feeding out of the line too fast has been utilized but which have been found to be objectionable for various reasons.

In the present invention, it is my purpose to provide an automatic means whereby the rotary movement imparted to a reel during a cast of the bait may be easily and quickly retarded when desired by simply giving a partial rotary movement to the pole upon which the reel is fastened.

The present invention comprises various details of construction, combinations and arrangements of parts which will be hereinafter fully described, shown in the accompanying drawings and then specifically defined in the appended claims.

Figure 1:
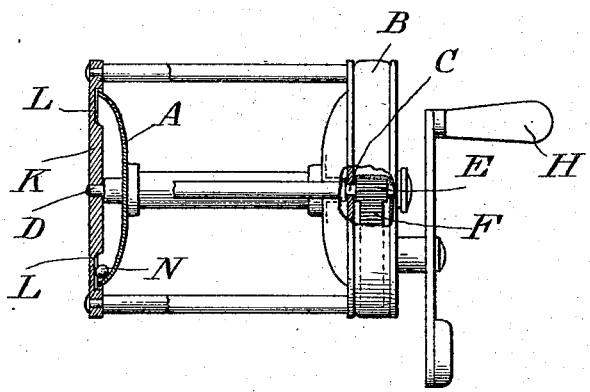
Figure 2:
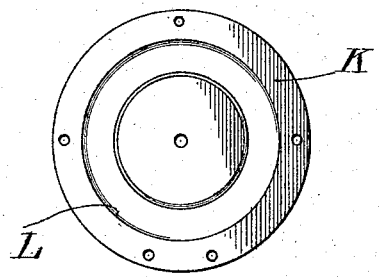

I illustrate my invention in the accompanying drawings, in which:

Figure 1 is a sectional view through a reel made in accordance with my invention. Fig. 2 is a face view of the inside of the rear end reel plate, and Fig. 3 is a detail sectional view.

Reference now being had to the details of the drawings by letter, A designates the end plates of a reel, the outer faces of which are concaved and form the usual construction of spools upon reels commonly in use, and B designates a housing at one end of the spool, and spindles C and D project centrally from the end of the reel and upon one of which C a pinion wheel E is fixed which intermeshes with a gear wheel F to which a handle H is fastened and forming means whereby the spool may be rotated for the purpose of reeling up the line. The other spindle D is mounted in a suitable bearing in the disk K which is fastened to the housing by means of screws and rotates in the usual manner. The inner surface of the disk K is provided with an annular groove L between which and the adjacent end plate of the spool of the reel an antifriction ball N is positioned.

In operation, when the reel is adjusted to the pole and it is desired to make a cast, the pole is held in such position that the reel will be held at a slight inclination to the left, as in Fig. 4. When the reel assumes this position the friction of the moving parts will be reduced to a minimum and the spool rotates freely. When it is desired to apply the brake, the pole to which the reel is attached is given an axial movement to the right, causing the reel to tilt in a similar direction, and, after the reel passes by a horizontal position in its movement to the right, the spool is retarded in its rotary movement. This action is brought about as the reel is tilted to one side or the other, because when the reel is tilted to the left the shoulder formed upon the spindle D contacts with the disk K and supports the spool against longitudinal movement, whereas, when the reel is tilted to the right the right hand end plate A supports the spool. Since the bearing member at the left end of the spool is much smaller than that at the right, the friction produced in the first position is less than in the second position. It is to be understood that in the operation of the reel, the spool has a slight longitudinal movement in the bearings in which the ends of its spindles are mounted, this movement being sufficient to permit the reel to assume a position in which the ends of the reel are out of frictional contact with the reel supporting frame, thus permitting the reel to rotate freely.

Figure 3:
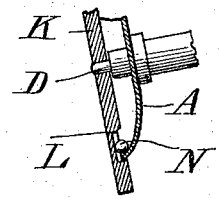

N is a ball interposed between the end plate A and the disk K and disposed within the groove L, as seen in Figs. 1 and 3. This ball has a bearing within this groove adjacent the edge of the end plate, said ball is retained in said groove and coöperates with the disk and end plate to cause a slight friction which tends to prevent back lash.

What I claim to be new is:—

1. A fishing reel comprising a frame with fixed end disks, a spool having concaved plates at its ends and spindles journaled in the end disks, the spindle of the spool contacting with one of the disks serving to support the spool against longitudinal movement and movable from contact with the end disks to reduce friction to a minimum when the reel is tilted in one direction, the plate at the other end of the spool being designed to frictionally engage the disk at the opposite end of the reel when the latter is tilted in the opposite direction and a ball interposed between an end plate and the adjacent disk.

2. A fishing reel comprising a frame with fixed end disks, the inner surface of one of which is provided with an annular groove, a spool having spindle ends journaled in said end disks and adapted to have a slight longitudinal movement, said spool provided with concaved plates, the spool spindle being adapted to bear frictionally against the concaved face of the disk of the spool adjacent to its outer marginal edge and the wall of the groove to reduce friction to a minimum when the spool is turning as the reel is tilted in one direction, and a ball movable in said groove and engaging the inner wall of the adjacent end disk, the plate at the other end of the spool adapted to bear frictionally against the opposite end of the reel frame when the reel is tilted in the opposite direction, thus serving to brake the rotary movement of the spool.

3. A fishing reel comprising a frame with fixed end disks, a spindle supported in said disks and having limited longitudinal movement in its bearings, a plate at one end of said spindle, said spindle being shouldered for contact with the disk to support the spool against longitudinal movement when the reel is tilted in one direction, the opposite end plate supporting the spool when the reel is tilted in the opposite direction, and a ball interposed between said disk and the adjacent end plate.

In testimony whereof I hereunto affix my signature in presence of two witnesses.

GEORGE S. YINGLING.

Witnesses:
L. F. GINTY,
JAMES J. MURPHY.

Copies of this patent may be obtained for five cents each, by addressing the "Commissioner of Patents, Washington, D. C."